(12) United States Patent
Vogel et al.

(10) Patent No.: US 8,234,961 B2
(45) Date of Patent: Aug. 7, 2012

(54) SAW BAND AND METHOD FOR THE PRODUCTION OF SAME

(75) Inventors: Josef Vogel, Horw (CH); Michael Balint, Dischingen (DE); Gerhard Peyerl, Geisenheim (DE)

(73) Assignee: Oerlikon Trading AG, Truebbach, Truebbach (CH)

( * ) Notice: Subject to any disclaimer, the term of this patent is extended or adjusted under 35 U.S.C. 154(b) by 433 days.

(21) Appl. No.: 11/939,394

(22) Filed: Nov. 13, 2007

(65) Prior Publication Data
US 2008/0121084 A1 May 29, 2008

(30) Foreign Application Priority Data
Nov. 24, 2006 (CH) .................................... 1896/06

(51) Int. Cl.
*B26D 1/46* (2006.01)
*B27B 13/02* (2006.01)
*B23D 57/00* (2006.01)

(52) U.S. Cl. .......................................... 83/661; 83/835
(58) Field of Classification Search .............. 83/661, 83/838–843, 852, 853, 835, 855
See application file for complete search history.

(56) References Cited

U.S. PATENT DOCUMENTS

| | | | | |
|---|---|---|---|---|
| 2,120,963 A | * | 6/1938 | Biro .................................. | 83/661 |
| 2,852,052 A | * | 9/1958 | Hansen ............................. | 83/661 |
| 3,745,869 A | * | 7/1973 | Ludwig ............................ | 83/661 |
| 3,788,182 A | * | 1/1974 | Tyler ................................ | 83/835 |
| 3,988,955 A | * | 11/1976 | Engel et al. ...................... | 83/661 |
| 4,031,793 A | * | 6/1977 | Miaskoff ......................... | 83/788 |
| 4,292,871 A | * | 10/1981 | Neumeyer et al. .............. | 83/661 |

(Continued)

FOREIGN PATENT DOCUMENTS
DE 33 07 170 A1 9/1984
(Continued)

OTHER PUBLICATIONS

J. Rech, Cutting Edge Preparation and Surface Issues, Laboratory of Tribology and Systems Dynamics, HSS Forum's International Conference, Aachen, Feb. 2-3, 2005, p. 1-12.

(Continued)

*Primary Examiner* — Ghassem Alie
*Assistant Examiner* — Bharat C Patel
(74) *Attorney, Agent, or Firm* — Notaro, Michalos & Zaccaria P.C.

(57) ABSTRACT

A saw band of steel for a band saw machine with a band back (Br) and with a tooth row arranged thereon having several teeth (20), wherein the initial tooth form (10) is triangular with a tooth base with tooth width (b) and with the tooth tip (1) with a first tooth height (h1), such that the tooth tip (1) does not project beyond tooth width (b) in the band running direction (L), wherein the lateral side of the triangle located in front in the running direction (L) forms the rake face (2) and the rear lateral side forms the clearance face (3) of the tooth (10, 20). The tooth tip (1) of the triangle is specifically removed for the development of a rounded-off tooth crest (4) with a reduced second tooth height (h2), wherein at least in the proximity of the tooth crest (4) a hard material coating covers at least partially the cutting face formed of the tooth crest (4), the rake face (2) and the clearance face (3).

13 Claims, 4 Drawing Sheets

U.S. PATENT DOCUMENTS

Figure 1:
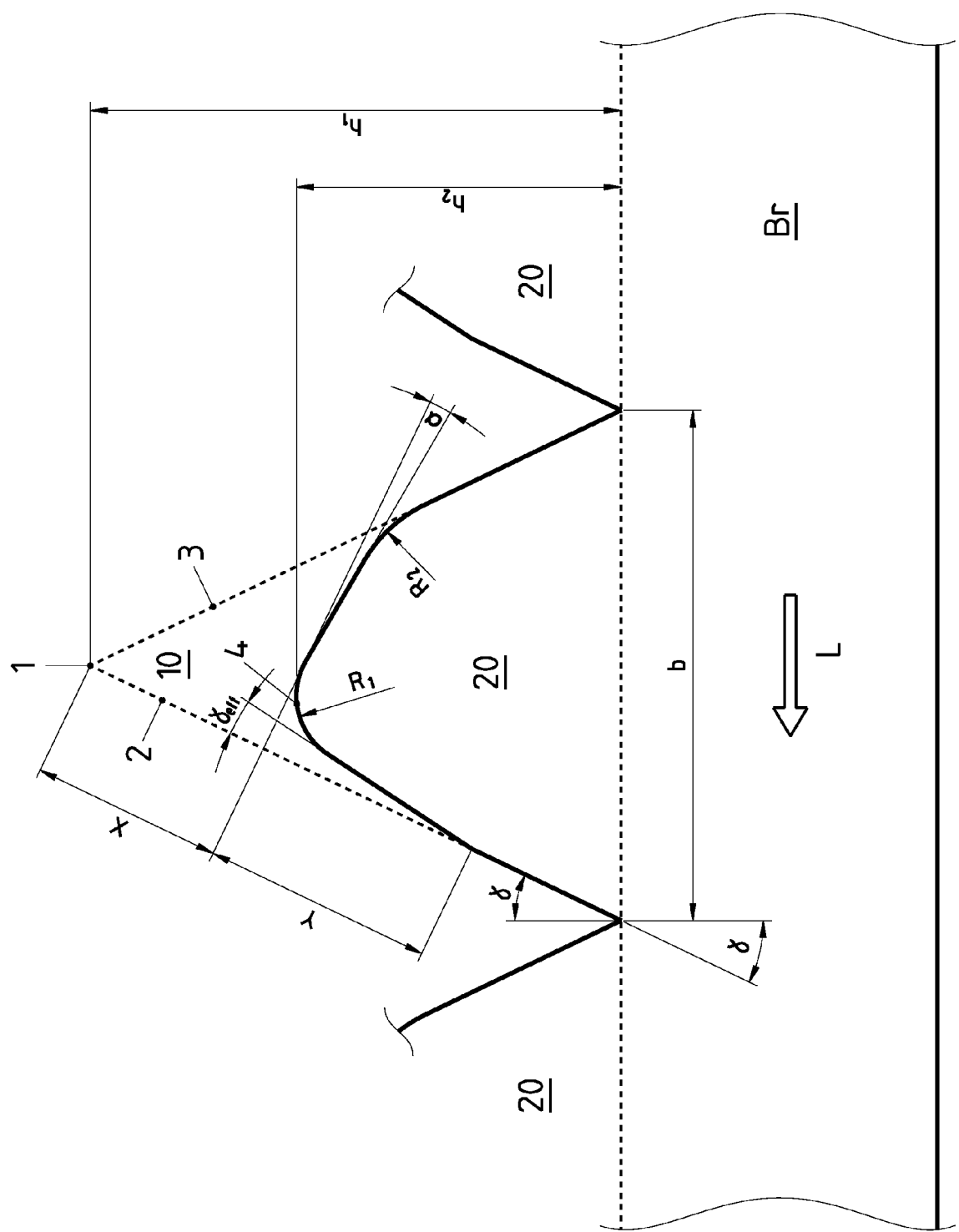

| | | | |
|---|---|---|---|
| 4,640,172 A | 2/1987 | Kullmann et al. | |
| 5,249,485 A * | 10/1993 | Hayden, Sr. | 76/112 |
| 5,331,876 A * | 7/1994 | Hayden, Sr. | 83/661 |
| 5,410,935 A * | 5/1995 | Holston et al. | 83/851 |
| 5,501,129 A * | 3/1996 | Armstrong et al. | 83/848 |
| 5,697,280 A * | 12/1997 | Armstrong et al. | 83/848 |
| 6,003,422 A * | 12/1999 | Holston | 83/661 |
| 6,167,792 B1 * | 1/2001 | Korb et al. | 83/835 |
| 6,321,618 B1 * | 11/2001 | Hayden, Sr. | 76/112 |
| 6,601,495 B2 * | 8/2003 | Cranna | 83/848 |
| 6,681,674 B2 * | 1/2004 | Hakansson et al. | 83/661 |
| 6,834,573 B1 * | 12/2004 | Nakahara | 83/851 |
| 6,988,318 B2 * | 1/2006 | Buchtmann et al. | 30/350 |
| 7,036,415 B2 * | 5/2006 | Tsujimoto | 83/661 |
| 7,174,823 B2 * | 2/2007 | Cranna | 83/848 |
| 2002/0184981 A1 * | 12/2002 | Tsujimoto | 83/13 |
| 2004/0026236 A1 * | 2/2004 | Penich et al. | 204/192.15 |
| 2004/0118263 A1 * | 6/2004 | Hellbergh | 83/846 |
| 2004/0182218 A1 * | 9/2004 | Chao | 83/848 |
| 2005/0098013 A1 * | 5/2005 | Miller | 83/661 |

FOREIGN PATENT DOCUMENTS

| | | |
|---|---|---|
| DE | 10 2005 016953 | 8/2006 |
| EP | 0 093 706 | 11/1983 |
| EP | 2 121 229 B1 | 11/2009 |

OTHER PUBLICATIONS

B. Denkena, et al., Cutting Edge Preparation of Cemented Carbide Tools, wt Werkstattstechnik online, Jahrgang 93 (2003), p. 202-207.

M. Shulte, et ano., Cutting Edge Preparation and Coating of Cemented Carbide and Cermet Tools, www-isf.maschinenbau.tu-dortmund.de, ISF.de, 2002.

F. Barthelma, News From Tool Research, Schmalkalden Werkzeugtagung, 10/11, Nov. 2004, p. 1-11.

* cited by examiner

SAW BAND AND METHOD FOR THE PRODUCTION OF SAME

BACKGROUND OF THE INVENTION

The invention relates to a saw band of steel for a rotary band saw machine according to the claims. The invention furthermore relates to a method for the production of a saw band.

Publication WO 2005/014877 A1 discloses the coating of a steel band in a roll-to-roll process, wherein on the band, preferably produced of cold-worked steel, a layer of different hard materials is applied on one side or, in successive process steps, on both sides. From this band subsequently a saw band can be produced.

Of disadvantage herein is that the coating takes place from the side. Therewith onto the functional faces (clearance area and chip area) exposed most strongly to wear the least layer thickness is applied and onto the less stressed side faces the greatest layer thickness, and consequently the costly coating material is poorly utilized. In addition, the coating is frequently applied on cold-worked steels which are only subsequently hardened, which can have a disadvantageous effect on the layer/substrate bond. On the other hand, such cold worked steels cannot be readily coated after the hardening, since conventional PVD processes, i.e., physical vapor deposition processes, far exceed the tempering temperature of such materials. Low-temperature PVD processes, on the other hand, have the disadvantage of generating poorly adhering layers which, especially under high loading, such as during sawing and abrasive wear, is of significant disadvantage. Since the layer thicknesses known in prior art are significantly greater than 5 μm, they are expensive in production and do not offer any significant improvement compared to uncoated saws, since here the layer tends to break off at the saw point during the entering and, consequently, the advantages of the coating no longer come to bear here.

WO 2006/089753 discloses a steel saw band for a band saw machine which is provided with a hard material coating whose thickness on the clearance areas of the tooth row is greater than on the side faces. With such coated bands, excellent results could to some extent be achieved in long-term saw trials. However, it was found that these results were frequently not reproducible and, to some extent, layer spalling occurs already during the cutting-in process necessitating therefore a careful cutting-in process.

As already stated, in saw bands of prior art, which are conventionally produced by mill-cutting or grinding, a cutting-in process is necessary in which the band is operated at lower pressure and/or slower infeed. On the one hand, this is cumbersome and, on the other hand, lowers the productivity. If the cutting-in process is omitted, a strong rise of wear occurs at the teeth, at least in uncoated saw bands, and an increase of the cutting time with the band most often becoming unusable within a few cuts. In coated bands an increase of the cutting time can also be found which, as a function of the clearance angle α, differs in magnitude. Further, premature wear may occur which can have a negative effect inter alia due to the saw running untrue i.e. deviating from the predetermined cutting plane.

SUMMARY OF THE INVENTION

The present invention addresses the problem of eliminating or of decreasing the disadvantages of prior art. The invention in particular addresses the problem of providing a saw band for a band saw machine as well as a method for the production of such a saw band, which, in the working in particular of metallic materials, makes possible the reliably reproducible, greater productive capability. Further, in the production as well as in the use of such a saw band, the economy is also to be improved. The latter is to be attained in particular thereby that by utilizing a saw band according to the invention, the otherwise necessary cutting-in process is shorter or can even be omitted entirely.

The problem is solved in the saw band according to the genus in accordance with the invention, as well as in accordance with the production method of the invention. The dependent patent claims refer to advantageous further embodiments of the invention.

The invention relates in particular to a coated saw band with which it is possible under conventional cutting conditions to cut immediately without the time consuming intermediate step of the band cutting-in otherwise necessary for new bands. This is attained, on the one hand, through a special tooth form and a subsequent suitable coating, on the other hand. A special abrasive brush method lends the necessary form to the tooth.

A saw band having a tooth geometry corresponding to that described in detail in FIG. 1 can unexpectedly be operated immediately under conventional conditions of use. Compared to bands coated as described in WO 2006/089753, a marked productivity advance can be observed. The coating can advantageously take place corresponding to said application and its content is herewith considered to be an integrated component of the present application.

Layers especially well suited for the saw coating are TiAlN as well as AlCrN layers, such as can be produced for example on industrial coating systems of type BAI 1200 or RCS. Further layers, which also yielded at least in special layer/working material combinations a marked increase of the cutting capacity, were combinations of TiAlN, AlCrN, CrN, as well as the carbonitrides and carbides of the corresponding layers, for example also as multi-coat or gradient layers with increasing carbon content, combined with metallic or metal-free DLC (Diamond Like Carbon) cover layers, as well as various Si-containing layers, such as for example TiAlSiN, AlCrSiN and the corresponding carbonitrides with an Si content between 1 to 12 at % relative to the total metal content.

Further especially suitable layer systems comprise other hard materials also, such as one or several metals of subgroups IV, V or VI of the periodic system of elements (transition metals) or aluminum or silicon and their compounds. Especially to be considered for this purpose are the nitrides, such as the known TiN, VN or TiSiN or SiN, carbides or carbonitrides, such as for example TiCN, VCN, borides, oxides, such as for example $Al_2O_3$ $(AlCr)_2O_3$ as well as other mixtures of the corresponding nonmetals, such as, for example, boron nitrides, carbo-oxy-nitrides, and others, with said metals. Multicoat layer systems as well as especially implemented adhesion and transition layers can herein also be of advantage for the working of certain materials.

Especially advantageous with respect to service life, as well as cutting rates and infeeds has been found to be a coating of a material based on nitride. In advantageous embodiments the coating can herein comprise TiN, TiCN, TiAlN and/or AlCrN. All materials can herein also be utilized as alloys or mixtures.

A further coating well suited for practical application can have WC/C as a cover layer, since this metal-containing DLC layer system has especially good cutting-in behavior, for example a layer smoothing during the first cutting cycles. As support layer can be considered especially the above listed systems.

If in an advantageous further development of the invention the coating has a thickness of 2-3 μm, this leads advantageously to a very smooth uniform running of the saw band, and not to jamming or the like problems, which could result in a coating with greater thickness when sawing workpieces.

However, the layer thickness depends also on the tooth spacing, the tooth geometry, the material to be worked and the material of the coating itself, whereby from case to case greater layer thicknesses are also feasible.

Therefore the correct layer thickness must be set for the optimization of the cutting capacity of a saw coated according to the invention. Trials have unexpectedly revealed that thinner layers, for example between 0.5 to 3 μm, in particular between 0.7 and 2 μm, yield significantly better cutting results than thick layers, starting at a layer thickness of approximately 4 μm and more. The latter could attain only low or even no improvement of the cutting behavior compared to uncoated bands.

In a further embodiment of the invention it may be provided that the tooth row is comprised of HSSE. Together with the coating according to the invention, this base material for the tooth row leads to an especially wear-resistant saw band. In the process, the band back can be fabricated of a relatively simple "soft" steel, whereas the tooth row is comprised of a high-performance high-speed steel, preferably of HSSE. The tooth row is herein preferably connected with the band back utilizing a welding method. The shortest cutting times and the long-term best reproducible results were attained with coated bands with a rake angle of 0°.

Based on the above described starting position, various treatment steps were tested after the primary forming (conventionally a mill-cutting or grinding process) or before the coating of the saw blade. While in several methods, such as surface blasting with angular and round shot, various sharpening and whetting methods and simple brush methods, saw blades could be deburred, however, parts treated thusly did not achieve in tests a clear improvement in service life or reproducibility of the band quality. It was also not possible using such methods to shape the tooth form in a geometrically defined manner.

However, it was unexpectedly feasible according to the present invention to increase substantially with a special abrasive brush method the productivity as well as also the reproducibility of saw blades, and in particular of subsequently coated saw blades. A saw band comprising a tooth geometry corresponding to that described in detail in FIG. 1, which was formed with the abrasive brush method, can be immediately operated under conventional application conditions with increased service life. This shaping brush method permits, in addition, an especially economical production of saw bands.

The various features of novelty which characterize the invention are pointed out with particularity in the claims annexed to and forming a part of this disclosure and are entirely based on the Switzerland priority application of CH 01896/06, filed Nov. 24, 2006.

The invention will be described schematically and by example with reference to Figures.

Figure 1A:
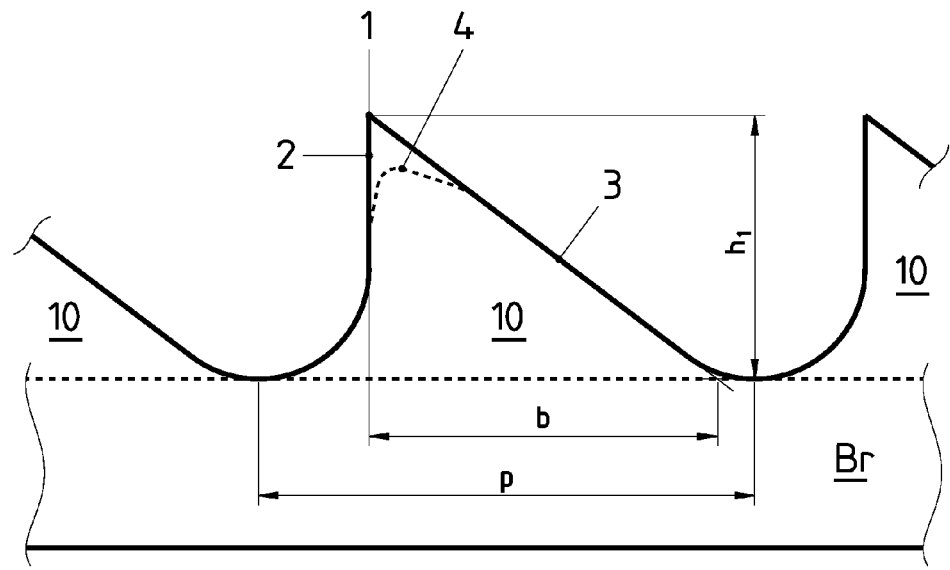
Figure 2:
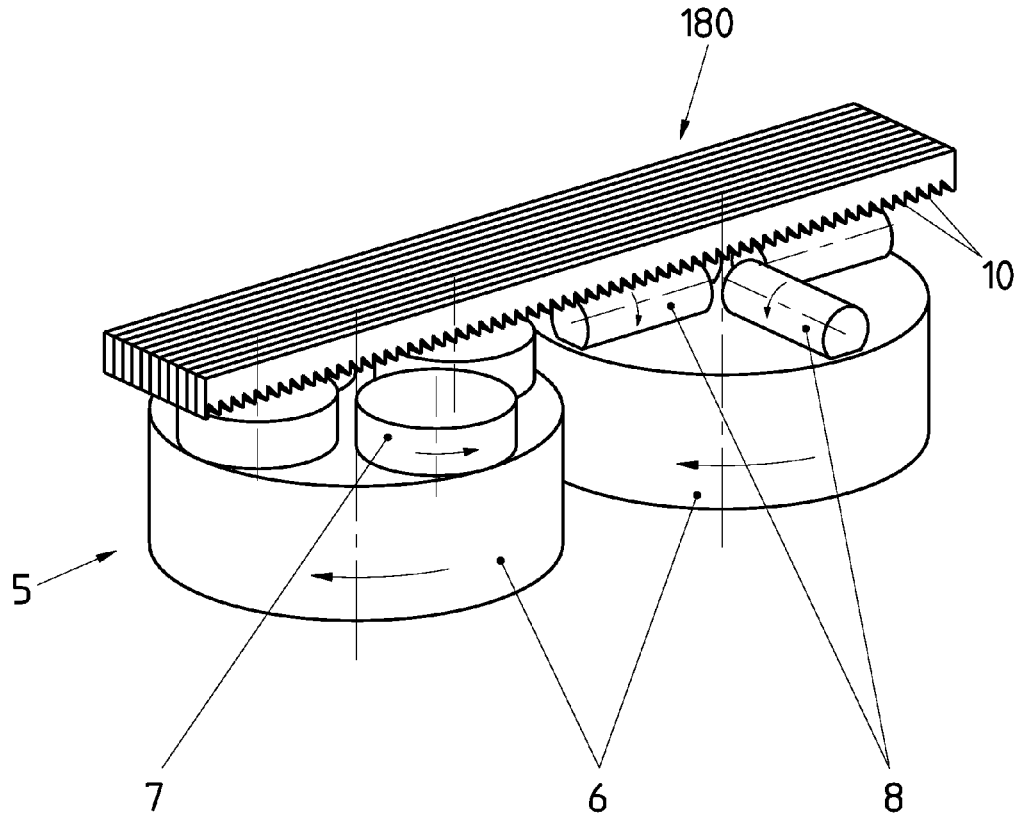
Figure 3:
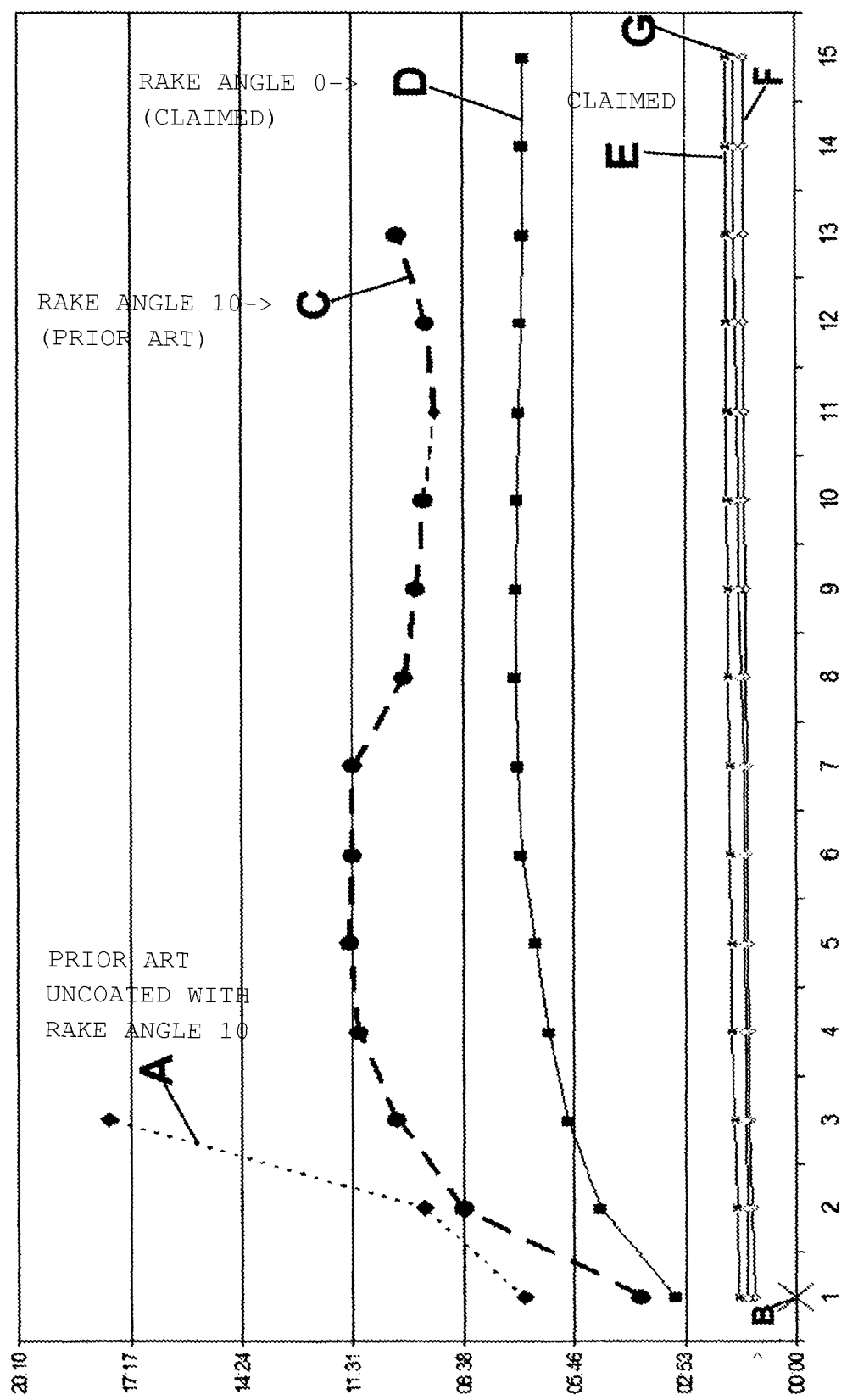
Figure 4:
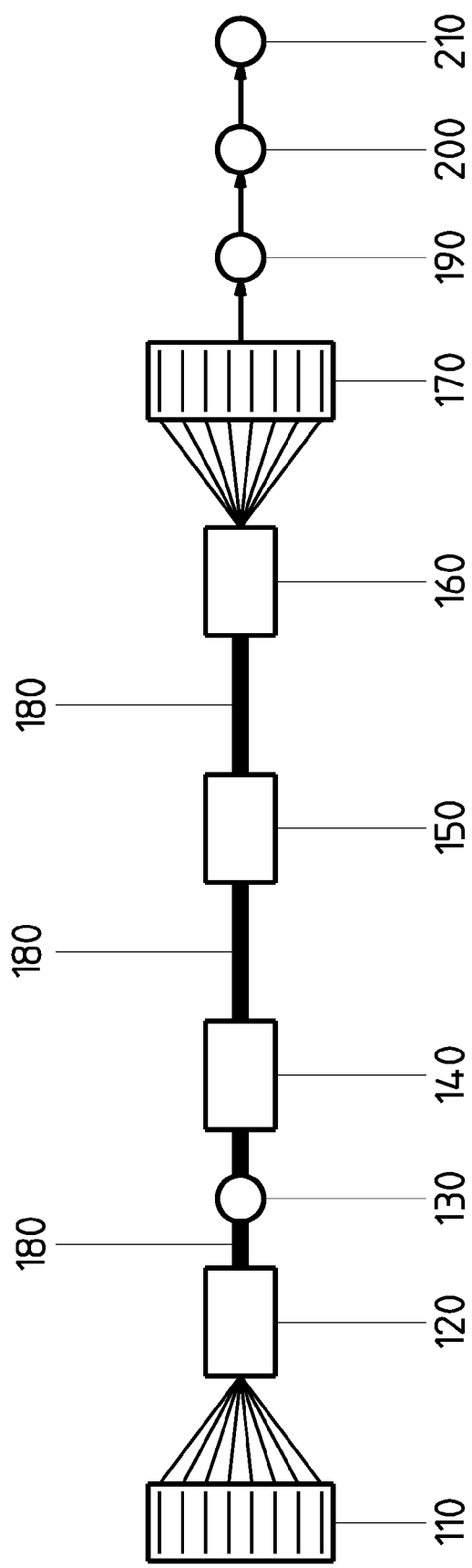

Therein depict:

FIG. 1 in large-scale representation, schematically and in side view the tooth geometry of a single tooth within a tooth row of a saw band after the working, FIG. 1a schematically and in side view a further example of a tooth geometry of a single tooth within a tooth row of a saw band with rounded-out base against the band back, FIG. 2 schematically in three-dimensional representation a brush device for the abrasive working of the tooth rows of a saw band packet for shaping the teeth, FIG. 3 a diagram with the representation of the service life as a function of the number of cuts in various tooth implementations and coatings, FIG. 4 schematically a production system for the production of saw bands according to the invention.

FIG. 1 depicts a preferred example of a tooth according to the invention such as can be produced through an abrasive brush process described above. Since the actual dimensions at the worked tooth crest are relatively small, for the sake of clarity the geometry of the tooth in the crest region is shown in FIG. 1 superproportionally and at a large scale. The original form of the tooth, thus, before it is worked, is substantially triangular with base b and height h1 and is built in as a tooth row on the band back Br and produced from a steel band in a manner known per se. The side lines of the triangle intersect in the point of the triangle or the tooth tip 1. The line of the triangle located in front in the running direction L of the saw band forms the rake face 2 of the original tooth 10 with the rake angle γ with respect to the perpendicular to the band running direction and the rear side forms the clearance face 3 of the original tooth 10. With the aid of the abrasive and forming method it becomes possible to modify under definition the geometry of the initial tooth 10 and to generate a modified tooth 20 with a tooth crest 4. The tooth height h1 is herein decreased, a rounded-off tooth crest 4 with tooth height h2 is formed with a cutting edge radius $R_1$ and a rear radius $R_2$, and an additional effective rake angle $\gamma_{eff}$ as well as a clearance angle α is formed. To attain a sustained improvement of the properties of the saw band, the adaptation of the original geometry of the triangular tooth 10 should be set to values within the following ranges for the generation of the modified tooth form 20:

| | |
|---|---|
| Initial tooth height h1: | 1.00 to 10.00 mm |
| Tooth width at base b: | 1.00 to 10.00 mm |
| Material removal height X: | 0.02 to 0.3 mm, preferably 0.02 to 0.10 mm |
| Canting length Y: | 0.00 to 0.3 mm, preferably 0.00 to 0.15 mm |
| Rake angle γ: | 0-70°, preferably 0-3° |
| Effective rake angle $\gamma_{eff}$: | 0-20°, preferably 4-10° |
| Clearance angle α: | 0-20°, preferably 4-10° |
| Cutting edge radius $R_1$: | 0.02-0.30 mm, preferably 0.03-0.15 mm |
| Rear radius $R_2$: | 0.02-0.30 mm, preferably 0.03-0.15 mm |

The material removal height X is herein measured from the tooth tip 1 of the original triangle to the tooth crest 4 of the modified triangle, along the rake face 2 of the triangle. A further sloping of the initial rake face 2 through further decrease of this face in at least one subsection determines the effective rake angle $\gamma_{eff}$ on the modified tooth 20. This subsection is denoted as canting length Y and is measured along the initial line in the direction of the band back Br of the rake face 2, from the foot point of the perpendicular on this line which touches the tooth crest 4 of the modified tooth 20. This canting length extends maximally to the base of tooth 10, 20. The tooth width b remains the same for the initial tooth 10 and the modified tooth 20. The tooth tip 1 of the original tooth triangle lies within the tooth width b of teeth 10, 20, viewed perpendicularly from the base of the triangle, and consequently does not project beyond this base in the band direction. After the modification and rounding-off of the original tooth tip 1 at the rounded-off tooth crest 4, the clearance face 3 appears at the clearance angle α which is measured with respect to the perpendicular to the rake face 2, which is in contact on tooth crest 4.

It is especially important to operate the method such that the radius $R_1$ of the cutting edge is set as described. FIG. 3 shows the dependence of the cutting time on the edge radius $R_1$, the rake angle y, the cutting number as well as the coating. The coating was carried out analogously to the examples described in WO 2006/089753 with a TiAlN layer of 1 to 2 μm thickness. The curves represented in FIG. 3 show the results for saw bands with the following implementations:

A uncoated, rake angle 10°.
B uncoated, rake angle 0°.
C coated, rake angle 10°.
D coated, rake angle 0°.
E coated, rake angle 0°, $R_1$ 0.06 mm F coated, rake angle 0°, $R_1$ 0.04 mm G coated, rake angle 0°, $R_1$ 0.03 mm.

Uncoated bands as shown in curves A or measuring value B can obviously not be driven under the set cutting conditions. While coated bands without preceding adaptation of the tooth geometry, for example through the described brush method, do show improved cutting behavior according to curves C and D, however, a marked cutting-in behavior with increased cutting times can be observed. In contrast to uncoated bands, bands with a rake angle of 10° show poorer cutting behavior and, starting already at the 13th cut, do not lead to a usable result.

Entirely different are the results with defined set cutting edge radii corresponding to the present invention as were set in the examples E to F between 0.03 and 0.06 mm. From the beginning a highly uniform cutting capacity with only a minimal rise of the cutting time is observed. In comparison to the known coated tools, an increase of the cutting rate by the factor 4 to 6 is simultaneously possible while maintaining the cutting quality.

The tooth form can advantageously be implemented such that it is rounded-off in the base region of the triangle form, such that from one tooth to the next a rounded-off transition is generated as is shown schematically and in side view in FIG. 1a. For clarification the removed tooth tip 1, thus the tooth crest 4 generated thereby, has been shown superproportionally enlarged with dashed line. The tooth triangle 10 here also has the base b and the two lateral sides are here also enclosed by the rake face 2 and the clearance face 3, whose lines intersect in tooth tip 1 and are extended to the base b. The initial tooth 10 in this case is only in the upper region a portion of the triangle itself and in the lower region deviates from it through the roundings. The triangle serves for the definition and the dimensioning. The tooth distances p from one tooth to the next in the tooth row on the band in this case do not coincide with the tooth width of the triangle base, as is depicted in the embodiment according to FIG. 1. In this preferred example the tooth width b of the triangle base is less than the tooth distance p, for example between 1.0 and 10.0 mm. The tooth distance p is in the range from 1.0 mm to 10 mm. The initial tooth height h1 is also in the range from 1.0 to 10.0 mm. Further preferred is the use of original teeth with a rake face 2 developed perpendicularly to the band direction, as is shown in FIG. 1a. The working of the tooth tip 1 in this example also takes place analogously to the values and the method as in the described example according to FIG. 1.

FIG. 2 shows a preferred brush device 5 with which the method according to the invention is applied to a packet 180 of approximately 10 to 100 saw bands. The device 5 is comprised of at least one horizontally rotating base body 6 on which plate-form brush tools 7 and/or circular working tools 8, such as for example cylinder-form brush tools, are disposed, which are preferably moved in the manner of planets and are guided over the initial teeth 10 of the saw bands such that the tooth tips are brought into the desired form through abrasive brushing. This abrasive brushing acts similarly to a grinding method, however, it is significantly more effective and simpler to handle, in particular in the cooperation with the present application for the forming of teeth in saw bands.

The brush device can also be implemented with laterally moved brushes or individual rotating brushes, such as plate-shaped or cylinder-shaped brushes which rotate about an axis. The saw bands themselves can in principle even be moved or both. The device does not necessarily need to be structured with planet-like brushes rotating about at least two axes.

However, a planetary configuration is highly preferred since herewith the problem to be solved can be realized especially well and economically. With the planetary movement the tools rotate about their own axes and the tools rotate jointly about the rotating carrier with the securement axle. Through the planetary movement the working tools are guided over the tooth tips 1 at a defined material removal rate and parameter settings such that on the tooth tips defined geometric forms are generated and simultaneously an optimized surface finish is attained in the friction region of the teeth 20.

The form of the tooth crest 4 to be set through the removal of material of an original tooth 10 away from its tooth tip 1 is determined by several parameters. For example through the initial tooth form 10, thus for example of a preferred triangle form, the development of the brush form, the materials and dimensions of the brush fibers, the type of brush movement and through the end relief angle of the brushes with respect to the teeth 10 to be worked of the tooth rows of the saw bands. Through various tool types and tool configurations in connection with differentiated parameters, consequently forms, geometries and finish at the tooth tips 1, 4 can be varied and produced according to requirement and specification.

Saw bands of the present type have a band thickness of 0.90 mm to 1.60 mm and a band length of 40 to 200 m. The width of the bands, thus of the band back Br with tooth height h2, are in the range from 27 to 80 mm. The initial tooth height h1 of the tooth triangle 10 is in the range from 1.00 to 10.00 mm and the tooth width b at the base of the triangle in the range of 1.0 to 10.0 mm.

In the following, important dimensioning values for a preferred example of the brushes 7 and of the brush arrangement 5 are specified for saw bands with teeth 10, 20 of HSS material. The brush arrangement is comprised of a planetary arrangement with a rotating carrier 6 as base body or planetary head and the plate-shaped brush tools 7 disposed thereon and rotating about their axis and/or rotating cylinder-form brush tools 8 disposed on the carrier 6. The rotating carrier rotates here at a speed of 40 to 60 rpm. The brush tool 7, 8 rotates at a speed of 600 to 1200 rpm. At the ratio of 1200 to 60, for example, the brush tool 7, 8 rotates approximately twenty times faster than carrier 6. The filaments of the brushes are substantially comprised of a synthetic material with abrasive material, such as grinding grains, embedded therein, for example extruded into it. The synthetic material is preferably one of PEEK (polyether ether ketone, for example Ultrapek by BASF or Victrex by ICI), PMIA (poly m-phenylene isophthalamides) or Nylon and, depending on the problem to be solved, carbon fibers (CF) can be embedded. The abrasive material is embedded into the synthetic material with a specific granulation, for example with granulation 240, preferably with several granulations. The abrasive powder-form grained material includes one of the materials carborundum, corundum, SiC or preferably diamond or mixtures of these materials. The diameter of such brush fibers, which are combined in a multiplicity on a carrier to form a brush, is 0.2 to 0.7 mm at a length of 15 to 25 mm. These filaments are inserted individually or in tufts in circular or plate tools, wherein, depending on the requirement, the orientation of the filaments or tufts to its running direction, and deviating from the perpendicular arrangement to the tool holder, can be selected to be variable.

The diameter of a plate-shaped brush tool 7 is, for example, 210 mm. According to the predetermined final dimension to be attained of the tooth crest 4, the brushes are operated at corresponding depth of engagement or are actively tracked. The rotational plane is substantially parallel to the band direction, however, it can, depending on the requirement, be slightly tilted for desired special forming. The arrangement permits working several saw bands simultaneously. Several saw bands can subsequently be combined to form a packet 180, preferably with a packet size of 10 to 100 saw bands. These are placed together in the packet such that the initial teeth are located one over the other and laterally aligned.

Working of the saw bands advantageously takes place with at least two stages with increasingly finer filament diameters.

For saw bands of the present type, this is preferably carried out in three stages. The three stages are herein realized, for example, in the following manner:

|  | Stage 1 | Stage 2 | Stage 3 |
|---|---|---|---|
| Filament diameter | 0.6 mm | 0.4 mm | 0.25 |
| Allocation length | 15 mm | 25 mm | 25 mm |
| Immersion depth | 0.2 mm | 0.4 mm | 0.6 mm |
| Rotational speed carrier/brush tool | 60/1200 rpm | 40/600 rpm | 60/1200 rpm |
| Filament material with diamond | PMIA | PMIA/CF | PMIA/CF |

One or more plate brush and/or roller brush sets are consequently guided according to the invention with the superimposed planetary movements over the tooth tips proceeding beneath. For this purpose the filament diameter with the cutting rate is selected such that the generated resisting torque in connection with the filament immersion depth to the tooth tip 1 yields a defined material removal rate and consequently a corresponding removal-shaping performance per unit time. Consequently, as described in the preceding example and depicted in FIG. 1, the tooth tip can be brought into the desired defined and advantageous form in economical manner. The introduced method can not only be applied to the shaping of teeth in saw bands, better results, in particular with respect to the cutting-in properties are also achieved for other types of saw blades, such as in particular for circular saw blades. However, the method is especially suited for said, and therefore preferred, band saw blades.

FIG. 4 shows schematically an industrial fabrication plant for the production of saw bands, such as bimetal or HSSE bands, according to the invention. A multiplicity of bands is mounted on a wind-out reel 110 in band form of large lengths. From the wind-out reel 110 the bands are wound out and combined to form a packet 180 of several bands and in the tooth working facility 120 the original teeth 1 in the band packet 180 are simultaneously preformed such that the teeth of the bands are aligned congruently one over the other. The teeth 1 of the band packet 180 are subsequently formed appropriately in the brush device 130, 5, as described above. In the alignment device 140 the aligning takes place of the saw bands and subsequently, in device 150, the tooth setting. In a continuous furnace 160 a temperature treatment takes place and the saw bands are subsequently wound onto the wind-up reel 170 separately from packet 180. A further temperature treatment in the annealing furnace 190 is carried out as needed before these are treated further in the cleaning station 200. The coating is subsequently carried out in a vacuum chamber 210 with a hard material layer, at least on the chip faces of the teeth 20, as has previously been described in detail.

The invention claimed:

1. Saw band of steel and being for a band saw machine with a band back (Br) and with a tooth row, the band back and tooth row lying in a plane, the saw band comprising:
   a plurality of teeth (20) formed in a series and forming the tooth row on said band back, the teeth being formed of the same material as the band back;
   each of said teeth (20) having a tooth form (10) that is triangular with a tooth base with a tooth width (b) and with a tooth tip (1) with a first tooth height (h1), such that the tooth tip (1) does not project beyond the tooth width (b) in a band running direction (L);
   wherein a lateral side of the triangular tooth form (10) located in front in the running direction (L) forms a rake face (2) and a rear lateral side of the triangular tooth form forms a clearance face (3) of each tooth;
   wherein material from the tooth tip (1) of the triangular tooth form (10) is removed such that the tooth tip is rounded off in the running direction (L) and in the plane of the band back and tooth row and is developed as a rounded-off tooth crest (4) that is rounded off both at the rake face (2) and at the clearance face (3);
   the rounded-off tooth crest (4) having a reduced second tooth height (h2) which is spaced apart from the base of the triangular tooth form (10) with tooth width (b); and
   at least in the proximity of the tooth crest (4) there is a hard material coating covering at least partially a cutting face formed of the tooth crest (4), the rake face (2) and the clearance face (3);
   the rake face (2) being inclined with respect to the perpendicular to the base and to the band back (Br) by a rake angle (y) that is in the range from 0° to 7°;
   the clearance face (3) being inclined with respect to the perpendicular to the rake face (2) by a clearance angle (α) that is in the range from 4° to 10°;
   a material removal height (X) from the tooth tip (1) of the triangular tooth form (10) to the tooth crest (4) measured along the rake face (2) of the triangular tooth form (10), being in the range from 0.02 to 0.30 mm at an initial tooth height (h1) of the tip (1) of the triangle of 1.00 to 10.00 mm and at a tooth width (b) at the base of the triangle of 1.00 to 10.00 mm; and
   the rounded-off tooth crest (4) in the uppermost region with the tooth height (h2) including a first cutting edge radius (R1) which is in the range from 0.03 to 0.15 mm.

2. Saw band as claimed in claim 1, wherein the material removal height (X) from the tooth tip (1) of the triangular tooth form (10) to the tooth crest (4) measured along the rake face (2) of the triangle, is in the range from 0.02 to 0.10 mm, at an initial tooth height (h1) of the tip (1) of the triangle of 1.00 to 10.00 mm and at a tooth width (b) at the base of the triangle of 1.00 to 10.00 mm.

3. Saw band as claimed in claim 1, wherein in the rear region of the tooth crest (4) toward the clearance face (3) of the triangular tooth form (10) a rounding-off is provided with a rear, second radius (R2) in the range from 0.02 to 0.30 mm.

4. Saw band as claimed in claim 1, wherein the coating comprises one or several metals of subgroup IV, V or VI of the periodic system of elements or aluminum or silicon.

5. Saw band as claimed in claim 4, wherein the coating comprises the nitrides, oxides, carbides, carbonitrides, borides of said metals or mixtures thereof.

6. Saw band as claimed in claim 5, wherein the coating comprises TiAlN, AlCrN, metallic or metal-free DLC, TiAlSiN, TiAlCN, WC/C.

7. Saw band as claimed in claim 4, wherein the coating is implemented as a multicoat system.

8. Saw band as claimed in claim 7, wherein the multicoat system comprises adhesion and transition layers.

9. Saw band as claimed in claim 1, wherein the coating has a thickness of less than 4 μm.

10. Saw band as claimed in claim 1, wherein the rake face (2) is inclined with respect to the perpendicular to the base and to the band back (Br) by a rake angle (y) that is in the range 0° to 3°.

11. Saw band as claimed in claim 1, wherein in the rear region of the tooth crest (4) toward the clearance face (3) of the triangular tooth form (10) a rounding-off is provided with a rear, second radius (R2) in the range from 0.03 to 0.15 mm.

12. Saw band as claimed in claim 1, wherein the coating has a thickness of 0.5 to 3 μm.

13. Saw band as claimed in claim 1, wherein the coating has a thickness of 0.7 to 2 μm.

* * * * *